United States Patent [15] 3,656,973
Paterson et al. [45] Apr. 18, 1972

[54] NON-NUTRITIVE FUNCTIONAL SUGAR SUBSTITUTE

[72] Inventors: Richard M. L. Paterson, Syracuse, N.Y.; Michael J. Skrypa, Florham Park, N.J.

[73] Assignee: Allied Chemical Corporation, New York, N.Y.

[22] Filed: July 18, 1968

[21] Appl. No.: 745,675

[52] U.S. Cl. .................................99/141 A, 99/1, 99/92, 99/129, 99/134, 99/139
[51] Int. Cl. .................................................A23l 1/26
[58] Field of Search ........................................99/141, 141 A

[56] References Cited

UNITED STATES PATENTS 2,554,152  1/1950   Osborne et al............................99/141
3,011,897  12/1961  Grosevenor ..............................99/141

Primary Examiner—Raymond N. Jones
Assistant Examiner—Roger B. Andewelt
Attorney—Gerard P. Rooney

[57] ABSTRACT

Use of a glucoside-sweetener mixture as a functional sugar substitute, particularly in the preparation of low-calorie food compositions, comprising a food material and a non-nutritive glucoside-sweetener mixture.

13 Claims, No Drawings

NON-NUTRITIVE FUNCTIONAL SUGAR SUBSTITUTE

Society today is very much interested in diets and other means of controlling or losing weight. Perhaps more than half of the American population is concerned with caloric intake and a market for low-calorie food products has increased approximately 50% during the period of 1962–1966.

The use of artificial or synthetic sweeteners to replace sugar in all types of products has expanded enormously, particularly their use in the so-called "one calorie" beverages. These sweeteners, and products using them are favored by diabetics who must limit their carbohydrate intake. The concentrated nature of these synthetic sweeteners is such that very small amounts are required, and for convenience they are all often extended with other materials, such as lactose, low-density corn syrup solids, casein, gum arabic, glycine, and the like which are essentially calorigenic themselves. More significantly, the synthetic sweeteners in their extended form cannot replace sugar in many foods, since they lack the other functional properties of sugar-bulk, humectancy, water binding, and plasticizing. Thus, additional non-caloric ingredients are required if any significant reduction in calorie content is to be realized.

The bulk extenders which have been used with the non-nutritive sweeteners presently approved for human consumption, i.e. cyclamates and/or saccharin, are relatively few in number and many of the things which have heretofore been used have serious disadvantages. Some are nutritive and the use of any large amount of it defeats the purpose of using a non-nutritive sweetener. Others, such as lactose, are not rapidly soluble. Still others yield turbid solutions or solutions of too high a viscosity. There is, therefore, a great problem in extending a small quantity of a non-nutritive sweetener to the bulk density on a sweetened basis of sugar.

In addition, these extenders all suffer from disadvantages including color, taste, hygroscopic nature, tendency to separate, need for preservatives, and the like. More seriously the solid extenders, i.e. corn syrup solids, glycine, lactose, casein, and gum arabic, which are the major ingredients by weight in these and similar preparations, are metabolizable and hence undesirable for weight watchers, diabetics, and the like. On a weight basis these extenders are essentially calorically equivalent to sugar. Significantly, all the extended products are dispensed on a volume basis rather than on a weight basis. None of these are intended for use on a weight basis and none can be used instead of sugar in cakes, candy, or other high-sugar foods. In effect, none of these extended products contribute anything except sweetness.

It is highly desirable to have a sweetening agent which not only could be used on an equal volume basis with conventional household granulated sugar, but which would provide equal bulk and texture to the foods, would have the same or superior solubility and non-caking tendencies, would have a minimum of the after-taste or bitterness associated with cyclamate and saccharin when used in hot or cold beverages, cereals or other foods and still have some of the desirable satiety derived from the use of sugar. Such a product would provide those individuals who desire to reduce their caloric intake for health or other reasons with a material that has all the functional attributes of sugar, but fewer calories. Furthermore, to make such a product attractive to the consumer, it would have to be low in cost and therefore simple to use with commonly used food ingredients.

It has now been found that a glucoside having the structural formula

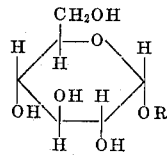

wherein R is a radical selected from the group consisting of a lower alkyl of one to four carbon atoms, and hydroxy-substituted lower alkyl, when employed in combination with sweetening agents acts as a functional sugar substitute. Exemplary of suitable glucosides include methyl glucoside, ethyl glucoside and hydroxyethyl glucoside. It is to be understood that since the glucoside can occur in either an alpha or beta configuration, it is contemplated within the scope of the present invention that the term "glucoside" is meant to include the various stereo-and optical isomers and mixtures thereof, e.g. alpha dextro-rotatory form.

It has been found that the glucoside-sweetener mixture has a unique combination of desirable properties for use in cakes, candies, jams, preserves, frostings, frozen desserts and the like. The glucosides are white, crystalline solids, having no objectionable taste or odor with a high degree of solubility in water and are non-toxic and non-metabolizable. With respect to the use of the glucoside-sweetener mixtures in food compositions, they may serve to replace in whole or in part the sugar normally present in these food compositions. Suitable sweetening agents include glycyrrhizin and noncaloric synthetic sweetening agents, such as the cyclamates, perillartine, flavonone glycoside derivatives, saccharin and/or mixtures thereof. Other potentiating agents, such as maltol, ethyl maltol and the like, may also be combined with the glucoside-sweetener mixture. If the sweetener is in solid form, the glucoside and sweetener may be intimately mixed in any desired ratio to form a free-flowing mixture. Alternatively, the sweetener may be employed in the form of a liquid or solution in which case the sweetener is combined with the glucoside by any well known spraying technique so that the glucoside sweetener mixture is in the form of a free-flowing mixture.

As mentioned above, the amount of sweetening agent employed may vary depending on the degree of sweetness desired and the food product to which the non-nutritive, functional sugar substitute of the present invention is to be added. However, sweeteners generally are employed in an amount ranging from about 0.05 up to about 10% by weight, preferably about 0.15% up to about 7.5% by weight based on the weight of the glucoside employed, bearing in mind that the saccharin-type of synthetic sweetener is about ten times as sweet as the cyclamate-type of synthetic sweetener. When mixtures of these synthetic sweetening agents are to be used, the composition of such mixtures generally is based on this fact, i.e. saccharin is about ten times as sweet as the cyclamate. Thus, when a mixture of saccharin and cyclamate is employed the mixture contains a ratio of cyclamate to saccharin in the order of about 10 to 1. Again, this ratio may vary depending upon the nature and the desired sweetness of the food composition to which the glucoside is to be added. These synthetic sweetening agents may be added either as the free acid, i.e. cyclamic acid, or as the alkali salt, such as the calcium, sodium, potassium or ammonium salts.

Mixtures of alkali salts of either cyclamate and/or saccharin may be employed; for instance, a mixture of sodium cyclamate and calcium cyclamate can be employed as the synthetic sweetening agent. Additionally, sweetening agents such as sorbitol, glycerol, dextrose, mannitol, maltol, gum arabic and the like may be employed in addition to or in lieu of synthetic sweetening agents, except that these are at least partially metabolizable and add calories to the ultimate food composition.

The glucosides are white, crystalline, highly soluble and odorless materials which are non-toxic, non-caloric, non-deliquescent and have good hydration qualities with a mildly sweet taste. Thus, when combined with small amounts of a sweetening agent, there results a combination which is an all-purpose, non-nutritive sugar substitute that can be used in all food areas with little or no recipe change, i.e. cakes, cookies, frostings, icings, fudges, soft cream-type through hard butter-type taffies, hard and soft candies, jams and jellies, frozen desserts such as puddings, custards, and toppings, ice cream, salad dressing, fruit preserves, and low-calorie beverages.

The use of the glucoside-sweetener mixture as a non-nutritive, functional sugar substitute in the preparation of cakes is of particular advantage since the glucoside-sweetener mixture can replace all or part of the sugar in a typical layer cake with slight modifications in the formula and little or no loss in bulk. If sugar is omitted from a layer cake recipe and replaced with any of the so-called sugar substitutes now sold, if is not possible to produce a conventional flour layer cake. The product will not rise, it has a tough gelatinous texture, and is quite unpalatable.

In addition, the glucoside-sweetener mixture may be employed in essentially all types of bakery products including the several varieties of bread, cake, cookies, crackers, biscuits, pies, doughnuts, pastries and the like, which normally contain sugar. Furthermore, the other high calorie components of bakery products, such as flour, shortening agents and milk solids may be replaced in whole or part with the use in the bakery product of a non-nutritive, water-insoluble, hydrophilic, cellulosic material to produce a reduced calorie bakery food composition characterized by a reduction of at least about 50% in its caloric content in comparison to an equivalent bakery food and has an eating quality of at least about that equal to an equivalent bakery food. In addition, the non-nutritive functional glucoside-sweetener mixture may be incorporated directly into the food composition in an amount which is essentially the same, on a weight basis, as the sugar present in the corresponding conventional food composition.

Furthermore, because of the high solubility of the glucosides in aqueous solutions, these solutions have extremely high osmotic pressures, quite similar to sugar syrups which prevents the growth of molds and fungi and can be effectively employed in preserved fruit jams and jellies. Thus, unlike other sugarless preserves, no chemical preservatives or fungicides are needed with products prepared using a glucoside. Moreover, drastic reformulation is not necessary. For instance, in the preparation of low-calorie jams or jellies, the use of low methoxy pectin and a calcium salt is generally required which hampers the reproduction of the texture and mouthfeel of conventional preserves. However, with the use of a glucoside-sweetener syrup, neither a chemical preservative nor a thickening agent (to give body to the juice liquor) is required.

Accordingly, the present invention is broadly applicable to the use of a glucoside-sweetener mixture as a non-nutritive functional sugar substitute and has applicability in any food, food composition, food ingredient, or food product, whether comprising a single ingredient or a mixture of two or more ingredients, whether liquid-containing or solid, whether mainly carbohydrate, fat, protein, or any mixture thereof, whether edible per se, or requiring preliminary conventional steps, such as cooking, mixing, cooling, mechanical treatment, and the like. In other words, the glucoside-sweetener mixture may be employed in any food as a non-nutritive functional sugar substitute wherein sugar and/or synthetic sweeteners are conventionally employed.

In order to better understand the present invention the following Examples are offered:

EXAMPLE I

Preparation of Glucoside containing Synthetic Sweetener

A. Powdered methyl glucoside (100 parts) is mixed in a "P-K" twin shell blender with a saturated aqueous solution containing 2.0 parts of a 10:1 mixture of calcium cyclamate and calcium saccharin. The mixture is blended till homogenous, dried and crushed and screened. The bulk density is about 0.8 to 0.9 g/cc and the particle sizes are in the order of about 40 to 100 mesh.

B. 100 parts of powdered methyl glucoside are dry blended with 2 parts of cyclamic acid and one part of sodium cyclamate in a mixer-muller for 15 minutes, then screened. This formulation has particular efficacy in fruit flavored beverages and desserts.

EXAMPLE II

A diabetic layer cake was prepared having the following composition:

| Ingredients | Quantity (parts by weight) |
|---|---|
| Flour | 100 |
| Methyl glucoside sweetener of ExampleI-A | 130 |
| Shortening | 55 |
| Egg Powder | 15 |
| Milk | 120 |
| Cream of Tartar (Potassium bitartarte) | 4 |
| Sodium bicarbonate | 2 |
| Salt | 1.5 |
| Vanilla extract | 1 |
| Water | 40 |

The shortening and methyl glucoside sweetener were creamed together in the bowl of a Sunbeam Mixmaster mixer at high speed. The egg powder was mixed with the water at high speed, then added to the shortening-sugar substitute mixture, and the system was beaten until it attained a uniform lemon color — about 5–10 minutes at high speed. The other dry ingredients were blended together. Increments of the dry blend and of milk were alternately added to the egg-glucoside-shortening mix with the mixer operated at low speed. When the mixture appeared reasonably homogeneous the batter was poured into round 8 inch diameter Teflon coated cake pans and baked in an oven at 350° F. for 25 minutes. The product was similar in height, texture and appearance to a normal yellow layer cake. The calorie content of the glucoside cake batter was 238 calories/100 grams in comparison to 334 calories/100 grams for a normal sugar cake.

EXAMPLE III

A low calorie layer cake was prepared having the following composition:

| Ingredients | Quantity (parts by weight) |
|---|---|
| Avicel [1] | 120 |
| Methyl Glucoside Sweetener of Example I-A | 135 |
| Egg Powder | 40 |
| Water | 70 |
| Milk | 165 |
| Baking Powder | 5 |
| Salt | 1.5 |
| Vanilla Extract | 1 |

(1) A commercially available cellulose derivative comprising crystalline aggregates prepared by acid hydrolysis of cellulose and has a particle size range of approximately 1 to 300 microns.

The egg and water were mixed as in Example II above, and the sugar substitute added. The procedure of Example II was then followed. The product was a yellow layer cake similar to that of Example I. However, the calorie content of the cake batter was only 65 calories/100 grams compared to 334 calories/100 grams for the normal flour-sugar layer cake.

Similar results are obtained employing methyl hydrocellulose having a degree of substitution (D.S.) of 0.75 in place of Avicel. This material is water-insoluble but hydrophilic.

EXAMPLE IV

A low-calorie fudge candy was prepared having the following composition:

| Ingredients | Quantity (parts by weight) |
|---|---|
| Unsweetened chocolate | 15 |
| Milk | 35 |
| Methyl Glucoside Sweetener of Example I-A | 100 |
| Salt | 0.5 |
| Butter | 7 |
| Vanilla Extract | 0.3 |

The chocolate and milk were heated on a hot plate and stirred till smooth. Then the sugar substitute and salt were added and stirring continued till the mixture was smooth and began to boil. The composition was allowed to boil slowly until the temperature rose to about 236° F., then it was removed from the hot plate. Butter and vanilla were then added and the system allowed to cool to 110° F. The product was beaten till fairly thick and poured into a greased pan to set and cool. The finished candy was similar to normal sugar fudge but had only 95 calories/100 grams in comparison to 345 calories/100 grams of the normal sugar fudge.

EXAMPLE V

Low-calorie hard candy bars were prepared having the following composition:

| Ingredients | Quantity (parts by weight) |
|---|---|
| Methyl glucoside sweetener of Example I-B | 100 |
| Tartaric acid | 2 |
| Water | 20 |
| Flavor and coloring | Optional; to taste as desired |

The ingredients were heated with gentle stirring, until a clear melt was obtained and continued to 356° F. This system was removed from the hot plate and allowed to cool in a cold greased tin. The product was a hard, clear, brittle, glass-like material which makes an excellent base for a variety of hard candy products. This material can be colored and flavored as desired, cast into small pieces like sour fruit balls (or boiled sweets), or into plaques with sticks for lollipops or suckers. By cooking to a lower temperature with the addition of shortening various softer toffee-type confections can be prepared, as will be obvious to those skilled in the art. The calorie content of the base material was only 1.5 calories/100 grams compared to over 350 calories per 100 grams for a similar sugar product.

EXAMPLE VI

A reduced calorie cake frosting was prepared having the following composition:

| Ingredients | Quantity (parts by weight) |
|---|---|
| Butter | 57 |
| Methyl glucoside sweetener of Example I-B | 200 |
| Vanilla extract | 2 |
| Salt | Trace |
| Water | 42 |
| Lemon Flavoring | Trace |

The butter was creamed and the salt and sugar substitute were added gradually. Vanilla and sufficient water were added to give a good consistency. The frosting was a typical creamed cake frosting but contained only 134 calories/100 grams in comparison to 402 calories/100 grams for a normal creamed sugar frosting, a reduction to 34% of the original calories. If desired, chocolate frosting could be prepared by adding unsweetened chocolate, or using chocolate to replace part of the sugar substitute. A methyl glucoside-glycyrrhizin sweetener is particularly efficacious with chocolate flavorings.

EXAMPLE VII

A low-calorie creamed cake frosting having the following composition was prepared:

| Ingredients | Quantity (parts by weight) |
|---|---|
| Avicel | 40 |
| Butter or oil | 10 |
| Methyl glucoside sweetener of Example I-A | 60 |
| Carboxymethyl cellulose (Hercules 9MXSP)[1] | 3 |
| Vanilla extract | 2 |
| Salt | Trace |
| Water | 100 |

(1) Degree of a substitution 0.8 to 0.95

The calorie content of this product is only 41.5 calories/100 grams. There is no deterioration of the frosting surface upon exposure to air.

In comparison the usual humectants glycerol, sugar, corn syrup, sorbitol, and the like, while effective contribute calories, e.g. (a similar composition using sugar of glycerol as a humectant had 105 calories/100 grams). Methyl glucoside, however, when used as a bulking agent in conjunction with synthetic sweeteners as a sugar substitute, is non-caloric and fully as effective as sugar in reducing the vapor pressure of water in the frosting.

EXAMPLE VIII

Table I, below, presents a comparison of ice cream, diabetic ice cream, and ice cream using the sugar substitute of the present invention.

TABLE I

| Ingredients | Parts by weight | | |
|---|---|---|---|
| | Ice cream | Diabetic ice cream | Low calorie ice cream with methyl glucoside |
| Fat | 10.1 | 10.1 | 10.1 |
| Milk solids, non-fat | 12.1 | 10.0 | 12.1 |
| Sod. caseinate | | 2.9 | |
| Sucrose | 12.8 | | |
| Corn syrup solids (dextrose) | 4.45 | | |
| Sorbitol and glycerol | | 16.0 | |
| Methyl glucoside sweetener of Example I-B | | | 17.5 |
| Stabilizer (CMC; carrageenan; emulsifier) | 0.30 | 0.20 | 0.30 |
| Water | 60.25 | 60.25 | 60.20 |
| Sweetener (calcium cyclamate) | | 0.25 | |
| Calories/100 grams | 200.1 | 185.4 | 133.9 |

Low calorie or dietetic ice creams are difficult to prepare because of the large amounts of fat and sugar in normal ice cream. The Standard of Identity fixes the minimum fat content at 10%. Skimmed milk solids (serum solids) can be added to make up the bulk and body of the omitted sugar, but beyond about 10–12% the additional lactose crystallizes out giving an objectional grainy, sandy texture. The reduction in solute also raises the freezing point of the mix so that under normal storage conditions the ice cream is objectionably hard. Methyl glucoside, however, contributed the necessary bulk and depressed the freezing point for the desirable soft texture, while keeping the calorie content low.

The advantages of methyl glucoside in lowering caloric content are obvious, the sorbitol and glycerol added to the diabetic recipe for freezing point depression contribute additional calories. The calorie reduction would be even more significant at lower levels of milk solids, and with ice milk or sherbert products which are much lower in fat.

These and other frozen desserts can be similarly formulated with a glucoside replacing all or part of the sugar

EXAMPLE IX

A low calorie grape jelly was prepared having the following composition:

| Ingredients | Quantity (parts by weight) |
|---|---|
| Welch's unsweetened grape juice | 70 ml. |
| Methyl glucoside | 70 gms. |
| Sucrose | 55 gms. |
| Disodium phosphate | 0.3 gm. |
| Citric acid (anhydrous) | approx. 0.25 gm. |
| Pectin N.F. | 1.0 gm. |

The sugar, methyl glucoside, pectin and sodium phosphate were dry blended. The grape juice was heated to boiling and the dry ingredients were added and the mixture was stirred with continued heating till dissolved. Citric acid was added. The pH was adjusted to 3—3.2 by adding either citric acid or sodium phosphate. The mixture was poured into jelly glasses and set aside to cool. The product is comparable in taste, appearance and texture to commercial grape jelly. Calorie content was only 116 calories/100 grams compared to 275 calories/100 grams for grape jelly made with all sugar.

Similar results are obtained using methyl glucoside and sorbitol or methyl glucoside, sorbitol and sucrose.

What is claimed is:

1. A composition of matter comprising a mixture of a glucoside having the formula

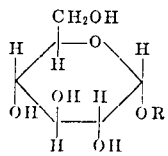

wherein R is a radical selected from the group consisting of a lower alkyl of one to four carbon atoms and a hydroxyl substituted lower alkyl of one to four carbon atoms, and a sweetening agent present in an amount ranging from about 0.05 to about 10% by weight based on the weight of the glucoside, said sweetening agent being selected from the group consisting of glycyrrhizin and synthetic sweetening agents.

2. The composition of claim 1 wherein the sweetening agent is selected from the group consisting of saccharin, glycyrrhizin, pellartine, flavonone glucoside derivatives and mixtures thereof.

3. The composition of claim 1 wherein the sweetening agent is saccharin.

4. The composition of claim 1 wherein R is methyl.

5. A food composition comprising a food material and a non-nutritive functional sugar substitute comprising a mixture of a glucoside having the formula

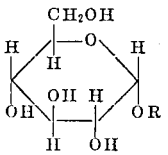

wherein R is a radical selected from the group consisting of a lower alkyl of one to four carbon atoms and a hydroxyl substituted lower alkyl of one to four carbon atoms and a sweetening agent present in an amount ranging from about 0.05 to about 10% by weight based on the weight of the glucoside, said sweetening agent being selected from the group consisting of glycyrrhizin and synthetic sweetening agents and said sugar substitute being present in substitution for an essentially equal weight of sugar.

6. The reduced calorie food composition of claim 5, wherein the sweetening agent is selected from the group consisting of saccharin, glycyrrhizin, perillartine, flavonone glycoside derivatives and mixtures thereof.

7. The reduced calorie food composition of claim 5 wherein the sweetening agent is saccharin.

8. The reduced calorie food composition of claim 5 wherein the food material contains at least one ingredient selected from the class consisting of flour, protein, flavoring agents, shortening, mild, leavening agents, salt, an assimilable sugar, hydro-colloid gums, and a surface active agent.

9. The composition of claim 8 which is a bakery food and at least a portion of the flour is substituted with a non-nutritive, finely divided, substantially non-fibrous, water-insoluble, hydrophilic cellulose derivative having a particle size of less than about 150 mesh.

10. The reduced calorie food composition of claim 5 wherein R is methyl.

11. The reduced calorie food composition of claim 5 in baked form.

12. The reduced calorie food composition of claim 5 in liquid form.

13. The reduced calorie food composition of claim 5 in frozen form.

* * * * *